US006242054B1

(12) United States Patent
Baalmann et al.

(10) Patent No.: US 6,242,054 B1
(45) Date of Patent: Jun. 5, 2001

(54) METHOD FOR CORROSION-RESISTANT COATING OF METAL SUBSTRATES BY MEANS OF PLASMA POLYMERIZATION

(75) Inventors: Alfred Baalmann, Osterholz-Scharmbeck; Henning Stuke, Bremen; Klaus-Dieter Vissing, Morsum; Hartmut Hufenbach, Bremen, all of (DE)

(73) Assignee: Fraunhofer-Gesellschaft zur Forderung der Angewandten Forschung E. V., Munich (DE)

( * ) Notice: Subject to any disclaimer, the term of this patent is extended or adjusted under 35 U.S.C. 154(b) by 0 days.

(21) Appl. No.: 09/530,404

(22) PCT Filed: Oct. 29, 1998

(86) PCT No.: PCT/DE98/03266

§ 371 Date: Jun. 16, 2000

§ 102(e) Date: Jun. 16, 2000

(87) PCT Pub. No.: WO99/22878

PCT Pub. Date: May 14, 1999

(30) Foreign Application Priority Data

Oct. 31, 1997 (DE) .............................................. 197 48 240

(51) Int. Cl.[7] ........................................................ C08J 7/18

(52) U.S. Cl. ....................... 427/489; 427/248.1; 427/294; 427/295; 427/309; 427/318; 427/327; 427/488; 427/490; 427/535; 427/539; 427/569

(58) Field of Search .................................... 427/488, 489, 427/490, 535, 539, 569, 294, 295, 309, 318, 327, 248.1

(56) References Cited

U.S. PATENT DOCUMENTS 4,391,843 7/1983 Kaganowicz et al. .
4,524,089 6/1985 Haque et al. .

FOREIGN PATENT DOCUMENTS 0 570 944 11/1993 (EP) .
WO 91 12092 8/1991 (WO) .

*Primary Examiner*—Bernard Pianalto
(74) *Attorney, Agent, or Firm*—Weingarten, Schurgin, Gagnebin & Hayes LLP

(57) ABSTRACT

The invention relates to a method for corrosion-resistant coating of metal substrates by means of plasma polymerization, wherein the substrate is subjected to mechanical, chemical and/or electrochemical smoothing in a pre-treatment step and is subsequently exposed to a plasma at a temperature of less than 200° C. and at a pressure of $10^{-5}$ bis 100 mbars, whereby in a first step the surface is activated in a reducing plasma and in a second step the polymer is separated from a plasma containing at least one hydrocarbon or silico-organic compound which can be vaporized in plasma conditions, optionally contains oxygen, nitrogen or sulphur and can contain fluorine.

19 Claims, No Drawings

METHOD FOR CORROSION-RESISTANT COATING OF METAL SUBSTRATES BY MEANS OF PLASMA POLYMERIZATION

SPECIFICATION

The invention concerns a process for the corrosion-resistant coating of metal substrates by means of plasma polymerization. The process is especially suitable for the corrosion-resistant coating of aluminum and aluminum alloys.

Ever since research began addressing the production of plasma-applied polymer layers by means of polymerization processes which produce the energy needed for polymerization by adding gaseous monomers to a gas discharge process, there has been no lack of attempts to deposit these layers in such a manner that they are able to protect the coated surface from different types of attack. This function is by no means trivial, since plasma-applied polymer layers are decidedly thin layers, measuring in the nanometer range up to a few micrometers. Not only were scratch-resistant layers developed, e.g. for optical functional elements made of plastic (WO-A 8504601), but there were also attempts, with moderate success, to use this type of layer to protect metallic materials. Even types of attack that must be considered less than severely corrosive were withstood by these layers for only very short periods of time.

In all the experimentation that is known at this time involving aluminum materials, oxide layers are used to promote adhesion in oxidizing plasma arrangements, and this is analogous to conventional lacquering processes, however, it is also analogous to the preparation of surfaces before gluing, where an oxide layer, which has usually been produced by anodic oxidation, is used. Activation of the boundary layer, which is desirable for good adhesion, is achieved, if at all, by intercalating substances of a foreign nature. Bonding is frequently carried out solely by means of adhesive forces. Experience has shown that such coating or gluing systems exhibit only moderate imperviousness to infiltration, because water vapor arising by diffusion or permeation processes weakens the bond between the material and the coating.

Plasma polymerization, on the other hand, is a process that is capable of coating solid objects by the action of a plasma on an organic molecule in the gas phase, whereby the coatings created in this manner are primarily organic in character and have excellent properties. Plasma polymerization belongs to the category of low-pressure plasma processes, and is used increasingly for industrial purposes. The great interest in this technology derives from the advantages of a rapid, contact-free, dry chemical coating process, which furthermore puts little stress on the work piece.

Plasma-applied polymer layers deposited by low-temperature plasmas, hereinafter referred to as plasma polymers, are distinguished by the following characteristics:

Plasma polymers are often three-dimensionally highly cross-linked and insoluble and swell only slightly or not at all, and are potentially good barriers to diffusion.

Compared to conventionally manufactured polymers, their high degree of cross-linking makes them unusually stable thermally, mechanically, and chemically.

The layers adhere well to most substrate materials, and have a high density and are free of micropores.

The layers are usually amorphous in structure, with a smooth surface that conforms to the shape of the substrate.

The layers are very thin, and the thickness of the layer amounts to only a few 100 nm down to 10 nm.

The process temperatures are low, i.e. room temperature up to approximately 100° C., especially up to approximately 60° C.

On the other hand, no processes are yet known with which metal substrates, especially substrates comprising aluminum materials, can be made corrosion-resistant by coating with a plasma polymer.

Ribbed pipes made from the material AlMgSi0.5 are frequently used in condensing boilers. When used under extreme conditions and in areas approaching the limits for allowable gas composition, such ribbed pipes do not always exhibit sufficient corrosion resistance.

The formation of corrosion products results in malfunctions on the gas side in the vicinity of the pipe ribs and, in advanced stages, a reduction of the heat exchanger surface on the combustion gas side, as well.

Conventional means for protecting against corrosion, which are state of the art, cannot be adopted for several reasons. Processes such as phosphatizing or chromizing bring about the continuous emission of heavy metal ions into the environment and must be excluded due to the likelihood of more restrictive anticipated legislation on waste water disposal.

Lacquer systems do not constitute a viable alternative, either. Lacquers used as a means for protecting surfaces compromise thermal conductivity, which in the present case can be tolerated only within very narrowly defined limits. Furthermore, in conventional lacquer coatings, the diffusion of water vapor leads to infiltration of the protective layer. Subsequent condensation on the metal surface causes the layer to separate in such systems, thereby accelerating the process of corrosion, as is known for localized types of corrosion.

Coating such ribbed pipes for heat exchangers with a plasma polymer would, in and of itself, be desirable. However, in experimental trials, in this connection, corrosion-resistant coatings were not achieved. As a rule, the plasma polymers were found not to adhere firmly enough to the metal surface, and infiltration of the coating was found to occur more or less rapidly, with the result that it soon showed signs of separating.

A process for the surface coating of silver objects is known from [the German patent application] DE-A-42 16 999, in which the surface is first treated with a stripping plasma, and the surface is then coated with a plasma polymer, whereby an initial coupling layer, a surface layer to prevent permeation on top of that, and finally a sealant layer are produced. Ethylene and vinyltrimethylsilane are especially used for the coupling layer, ethylene for the layer preventing permeation, and, for the sealant, hexamethyldisiloxane in conjunction with oxygen as a plasma forming monomer, whereby a continuous transition occurs between the plasma forming monomers. The coatings are largely scratch resistant, and they provide good protection against tarnish; in certain formulations, however, they can be susceptible to removal by cleansers. A coating on aluminum substrates fails to provide corrosion-resistant layers.

On the whole, it would be desirable to have a process available with which a long-lasting and corrosion-resistant plasma polymer coating can be applied to metal materials, especially aluminum materials.

This goal is achieved by a process of the type mentioned at the outset, where the substrate undergoes a pre-treatment step of smoothing by mechanical, chemical, and/or electrochemical means, after which, at a temperature of less than 200° C. and a pressure of $10^{-5}$ to 100 mbar, it is exposed to a plasma, whereby, in an initial step, the surface is activated in a reducing plasma and, in a second step, the plasma polymer is deposited from a plasma that optionally contains at least one hydrocarbon or organosilicon compound, which can be vaporized under the conditions of the plasma, containing oxygen, nitrogen, or sulfur, and which may contain fluorine atoms.

A surprising finding was that the problem of insufficient adhesion of the coating to the metal surface is solved by the combination of a smoothing pre-treatment of the metal substrate which is to be coated with a plasma treatment. The plasma treatment, in turn, consists of 2 steps, namely, first treatment of the surface by a reducing plasma which acts as a surface stripper, and a second step, in which the actual coating is applied directly to the metal layer that has been pre-treated by the plasma.

The pre-treatment, especially the smoothing of the surface of the metal substrate, can be carried out by mechanical, chemical, or electrochemical means. Especially preferred are combinations comprising both mechanical and chemical smoothing. In any event, electrochemical smoothing can be undertaken after mechanical and/or chemical smoothing, if the particular metal substrate in question will permit this. In the case of ribbed pipes, for example, the electropolishing method is not a suitable surface treatment for physical/technical reasons. Here one has to rely on chemical methods, such as acid or alkaline pickling. According to [the German patent document] DE-C-40 39 479, it is also possible to use a combination of pickling and mechanical disturbance of the surface by wiping, brushing, abrasive blasting processes, etc., whereby the work piece, in particular, is impacted by a jet of liquid containing both the pickling solution and particles with an abrasive action.

The pickling methods used in smoothing the surface are chemical processes in which aggressive chemicals are used to remove, primarily, layers of oxide, rust, and scale from the particular metal surface in question. Pickling solutions are usually acids that attack both the covering layers and the metal itself. Pickling is not a single process. Instead, different chemical and physical processes occur simultaneously and in succession. These processes are often electrochemical in nature, and involve the formation of local elements [sic] between the metal oxides and the metal surface.

Electropolishing is a method used for obtaining shiny metal surfaces, and it electrolytically removes raised bumps and ridges.

Chemical bright pickling is highly developed as a process for smoothing off surface roughness, especially for aluminum. It is fundamentally more important than electropolishing. There are many chemical bright picklers for aluminum.

Most chemical solutions for producing gloss are formulated on the basis of phosphoric acid. The addition of nitric acid produces reflecting surfaces as well as improving the surface quality. The addition of sulfuric acid makes the metal dissolve more quickly and results in the improved evening out of irregularities. There are other additives that can further speed up the rate at which the metal is stripped and extend the length of time the pickling bath will remain operational.

The effects of pickling, including bright pickling, can be made less variable and faster when they are used in conjunction with mechanical methods of surface treatment. According to the invention, such a combination of mechanical and chemical methods of surface treatment, as those described in [the German patent document] DE-C-40 39 479, is especially utilized for smoothing.

Due to the amphoteric properties of aluminum and its alloys, it is also possible to use alkaline solutions to clean and pickle them.

Generally speaking, the treatment to smooth the surface results in an average mean roughness of less than 350 nm, preferably less than 250 nm. By using electropolishing methods, and especially electropolishing after a mechanical/chemical smoothing process, an average mean roughness of less than 100 nm can be obtained.

However, surfaces that have been smoothed by such methods are still not optimally suited for the application of a plasma polymer. If a plasma polymer is applied after mechanical/chemical and/or electrochemical smoothing, it will not yet hold up for the desired length of time under corrosive conditions. In order to achieve that goal, one more surface treatment is needed, using a reducing plasma, especially a hydrogen plasma. Said plasma treatment takes place at temperatures of ≦200° C. and pressures of ≦100 mbar, especially ≦100° C. and ≦10 mbar. Other gases can be added to the hydrogen as the plasma carrier, e.g. hydrocarbons, and olefins in particular, as described below, as well as oxygen, nitrogen, or argon, whereby the reducing character must always be maintained.

This plasma treatment produces an activated surface. The reducing conditions presumably cause a decrease in the aluminum oxide layer and/or aluminum hydroxides which are near the surface on the metal surface, so that points of attachment arise where reactive bonding of a plasma polymer, subsequently applied, can arise directly on the metal. A further side effect is that the surface undergoes additional smoothing by the plasma treatment.

A plasma polymer is precipitated onto the plasma-treated surface, preferably under further reducing conditions at first. The main component of this plasma polymer is a hydrocarbon and/or an organosilicon compound, which can contain oxygen, nitrogen, or sulfur atoms, whereby said hydrocarbon or organosilicon compound has a boiling point such that it can be vaporized under the temperature and pressure conditions prevailing in the plasma coating chamber. Substances that would qualify for this purpose are primarily alkanes, alkenes, aromatic hydrocarbons, silanes, siloxanes, silazanes, and silathianes, preferably siloxanes. The utilization of hexamethyldisiloxane and hexamethylcyclotrisiloxane is especially preferred. Other compounds are hexamethyldisilazane and hexamethylcyclotrisilazane, as well as hexamethyldisilathiane. It is also possible to use higher homologs of these compounds and mixtures of such compounds, or their partially or completely fluorinated derivatives.

Hydrocarbons, especially olefins, e.g. ethylene, propene, and cyclohexene, can serve as co-monomers for the formation of plasma polymers from organosilicon monomers. Silanes, especially organosilicon compounds containing vinyl groups, can also be used as co-monomers, e.g. vinyltrimethylsilazane. These unsaturated monomers can be added in fixed or variable proportions to the organosilicon compound containing O, N, or S atoms, with one possibility being to add them in gradual increments. For example, when forming the plasma polymer step by step, it is possible first to form a transition layer on the metal surface, consisting solely or predominantly of the organosilicon compound, and subsequently to add the hydrocarbon. Another possibility is to proceed in the reverse order. Thus, the properties of the plasma polymer coating can be modified so as to provide optimal adhesion to the metal substrate and/or optimal resistance to corrosive substances. Such a manner of forming the layer in stages is known, for example, from [the German patent application] DE-A-42 16 999.

During plasma polymerization, other gases in addition to these monomers can also be added, e.g. oxygen, nitrogen, or argon, in order to modify the properties of the plasma and the plasma polymer.

Generally speaking, plasma polymerization takes place at a temperature of ≦200° C., preferably ≦100° C., and especially about 60° C. The pressure in the plasma coating chamber is usually ≦10 mbar.

The layer formed on the metal substrate by plasma polymerization expediently has a thickness of 100 nm to 10 μm. But it is not a problem to create layers with a thickness of less than 100 nm for special purposes.

Unlike other coatings, including plasma polymer coatings that are applied by using other methods, the surface is smoothed according to the invention by a pickling process that evens it out, and whose effectiveness is enhanced and rendered less variable by a superimposed light mechanical component. As a result, mechanical cramping of the polymer coating on the metal substrate caused by the relatively high roughness of the substrate occurs less often, and instead there is bonding of a rather more chemical nature to free valences of the exposed metal surface that has been stripped by caustic agents. Generally speaking, a bright, almost mirror-like finish that appeals to the eye is obtained on non-structured metal surfaces. The result, in particular, is that, with its thickness being what it is, the coating is no longer "swallowed up" by the surface structures of a rough metal surface, and instead a uniform, smooth layer is formed.

Corrosion resistance several times better than that obtained for industrial surfaces is achieved according to the invention.

A further increase in long-term corrosion resistance is achieved by incorporating a corrosion inhibitor which can be vaporized in a vacuum, preferably into the bottom-most layer of the plasma polymer coating. In a departure from previously available findings, it is not essential for such a corrosion inhibitor to be applied directly to the surface of the substrate, i.e. to be located directly at the level where adhesion takes place, thereby weakening it. Instead, it is effective at a distance, especially in connection with the use of conductive polymers. Suitable polymers of this type are, for example, polyanilines which have low vapor pressure [sic] in a vacuum, or which can be introduced into the plasma polymer in the most finely distributed form, in quantities of 0.1 to 1% by weight.

In addition to being used with aluminum materials, the technology described above can be applied to other metal materials as well, especially those with a tendency to form an oxide layer on their surface.

The process according to the invention can also be used for applying a plasma polymer primer to a metal substrate to which additional coatings are subsequently applied. This allows corrosion-resistant coatings of considerable thickness to be obtained for the most diverse purposes, and which have sufficient thickness to stand up to abrasive wear. Ormocers are especially well suited for this purpose. The structural composition of ormocer coatings is similar to highly cross-linked plasma polymer coatings, but they can be formed without the relatively slow vacuum coating process. Here, the typical thickness of the layer is on the order of 1 to 100 nm. Using them in combination, corrosion properties are obtained of a quality that is comparable to and as good as with plasma polymer coatings alone.

The process according to the invention is especially well suited for coating aluminum materials, whereby the resulting corrosion resistance renders the aluminum material especially suitable for being employed as a heat exchanger and for manufacturing ribbed pipes for heat exchangers in condensing boilers.

EXAMPLE

Rectangular samples of the material AlMgSi0.5 were used as the test material. The samples initially underwent a multi-stage cleaning process to remove foreign substances such as oils and greases. The surface of the metal pieces was then treated using a combined pickling and electro-polishing process.

The samples were first cleaned mechanically by a brush in a soap solution with a neutral pH, then they were rinsed off, and again treated with the soap solution for 30 minutes at t=70° C. in an ultrasonic bath. After more rinsing under running water and drying with hot air, they were degreased in the ultrasonic bath with acetone till they were as clean as possible and then they were dried with hot air.

The metal samples were next pickled in a pickling solution of 46.0 parts of water, 50.0 parts of concentrated nitric acid, and 4.0 parts of hydrofluoric acid for 120 s at room temperature. After rinsing with water and ethanol, the test piece was then polished electrochemically. A mixture of 78 ml of 70% to 72% chloric acid, 120 ml of distilled water, 700 ml of ethanol, and 100 ml of butyl glycol served as the electrolyte. Electropolishing was carried out for a period of 180 s at an electrolyte temperature of −15 to +8° C., with a polishing current of 5 to 18 A/dm$^2$ and a polishing voltage of 19 to 11 V.

Immediately following electropolishing, the sample was rinsed off with water and treated for 10 minutes with cold water in an ultrasonic bath. Finally, it was dried with hot air.

Prior to surface smoothing, the test piece had a matte surface with a mean roughness of 0.570 μm (averaged over 5 measurements). After the electropolishing, the mean roughness was less than 100 nm. The surface had a mirror-bright finish.

The plasma treatment was carried out in conventional plasma polymerization equipment, where the monomer gas was introduced into the low-pressure container and excited by a high-frequency alternating current and/or microwave energy to form a plasma.

In an initial plasma treatment step, the aluminum work piece was subjected to a hydrogen plasma at 60° C. and 50 mbar for 120 s. The hydrogen was successively replaced by feeding in hexamethyldisiloxane at a pressure of 10 mbar. The volume flow rate was 500 ml/min, and the maximum power output was 5 KW. The layer was applied at a thickness of 500 nm.

The example was varied by first having a plasma polymer substance, comprising ethylene as the monomer, applied to the metal surface during the plasma polymerization, to which increasing quantities of hexamethyldisiloxane were then added, until the ethylene was completely replaced.

In other trials, the monomers were supplemented by the addition of oxygen and nitrogen.

In all of these processes, highly corrosion-resistant, thin, transparent layers were deposited on the surface of the sheet aluminum, which retained its mirror-bright finish.

Using electromicroscopy, it was found that the plasma polymer layer had bonded well to the metal surface. The plasma polymer layer is amorphous and practically flawless, i.e. it has no pores or inclusions.

The corrosion properties of the sheet aluminum, which had been coated in this manner, were tested in 25% sulfuric acid at room temperature and 60 to 70° C., and then again in 20% nitric acid at room temperature. In the tests, which were conducted over several hours, all the samples were found to be resistant. No migration of the test liquid into the coating occurred, much less infiltration of the coating by the liquid. No separation phenomena were observed.

The pieces of sheet aluminum coated according to the invention were found to be absolutely corrosion-proof at 350° C. under conditions such as those that prevail in a heat exchanger for condensing boilers. Furthermore, they have reduced surface tension, and therefore tend to generate fewer mineral deposits, e.g. in the form of boiler scale. The reduced surface tension also provides protection against biological infestation, for example in work pieces that are exposed to seawater.

What is claimed is:

1. Process for the corrosion-resistant coating of a metal substrate by means of plasma polymerization, comprising:

smoothing the substrate with mechanical, chemical, and/or electrochemical smoothing;

producing an activated surface of the substrate by subjecting the substrate to a reducing plasma at a temperature of less than 200° C. and a pressure of $10^{-5}$ to 100 mbar; and depositing a plasma polymer on the substrate from a plasma that contains at least one hydrocarbon or organosilicon compound, optionally containing oxygen, nitrogen, or sulfur, that can be vaporized under the plasma conditions, and which may contain fluorine atoms.

2. Process according to claim 1, wherein the metal substrate is aluminum or an aluminum alloys.

3. Process according to claim 1, wherein the smoothing step comprises subjecting the metal substrate to a combination of a mechanical surface treatment and pickling.

4. Process according to claim 1, wherein the smoothing step comprises electrochemically polishing the metal substrate.

5. Process according to claim 1, wherein in the smoothing step, obtaining an average mean roughness of the metal substrate of less than 350 nm.

6. Process according to claim 1, wherein in the step of producing an activated surface, the temperature is less than 100° C.

7. Process according to claim 1, wherein in the step of activating the surface, the surface is activated by a hydrogen plasma at a pressure of ≦100 mbar.

8. Process according to claim 1, wherein in the plasma polymer depositing step, the organosilicon compound includes a siloxane, silazane, or silathiane.

9. Process according to claim 1, wherein in the plasma polymer depositing step, the organosilicon compound comprises a siloxane, or a siloxane comprising hexamethyldisiloxane or hexamethylcyclotrisiloxane.

10. Process according to claim 1, wherein in the step of producing an activated surface, the plasma includes a hydrocarbon, or a hydrocarbon comprising an olefin.

11. Process according to claim 10, wherein the hydrocarbon comprises ethylene, propylene, or cyclohexene.

12. Process according to claim 1, wherein in the plasma polymer depositing step, the deposition takes place at a pressure of ≦10 mbar under initially reducing conditions.

13. Process according to claim 1, wherein in the step of producing the activated surface, feeding oxygen, nitrogen, and/or a noble gas into the plasma.

14. Process according to claim 1, wherein in the plasma polymer depositing step, the plasma polymer layer is applied at a thickness of 100 nm to 1 μm.

15. Process according to claim 1, further comprising introducing a corrosion inhibitor into the plasma polymer.

16. Process according to claim 15, wherein the corrosion inhibitor comprises a polyaniline in a quantity of 0.1 to 1% by weight.

17. Process according to claim 1, further comprising applying an additional coating to the plasma-coated metal substrate.

18. A process according to claim 1, wherein the substrate comprises an aluminum heat exchanger.

19. Process of claim 18, wherein the aluminum heat exchanger comprises ribbed pipes.

* * * * *

UNITED STATES PATENT AND TRADEMARK OFFICE

CERTIFICATE OF CORRECTION

PATENT NO. : 6,242,054 B1
DATED : June 5, 2001
INVENTOR(S) : Alfred Baalmann et al.

It is certified that error appears in the above-identified patent and that said Letters Patent is hereby corrected as shown below:

Column 7,
Line 32, "alloys." should read -- alloy. --.

Signed and Sealed this

Twenty-seventh Day of August, 2002

Attest:

JAMES E. ROGAN

*Attesting Officer* *Director of the United States Patent and Trademark Office*